2,786,817
IRON CATALYSTS FOR CARBON MONOXIDE HYDROGENATION PRECIPITATED FROM FERROUS SULFATE SOLUTIONS

Walter Rottig, Oberhausen-Sterkrade-Nord, Germany, assignor to Ruhrchemie Aktiengesellschaft, Oberhausen-Holten, Germany, and Lurgi Gesellschaft fuer Waermetechnik m. b. H., Frankfurt am Main, Heddernheim, Germany No Drawing. Application April 2, 1952, Serial No. 280,173
Claims priority, application Germany April 16, 1951
12 Claims. (Cl. 252—440)

This invention relates to iron catalysts for carbon monoxide hydrogenation precipitated from ferrous sulfate solutions.

Processes for the catalytic hydrogenation of carbon monoxide are known. The hydrogenation may be effected so that the synthesis products contain large quantities of oxygen-containing compounds and preferably alcohols, or may be effected so that the synthesis products consist almost exclusively of hydrocarbons. The catalytic hydrogenation may be effected with various known catalysts of different compositions and is generally effected under elevated pressures though it is possible to carry out the synthesis at atmospheric pressure. The known catalysts used include melted catalysts, sintered catalysts and precipitated catalysts.

The use of precipitated iron catalysts which may contain activators, as, for example, copper, has proven particularly effective. In the preparation of these precipitated catalysts the iron, and, if necessary or desired, the activators to be added are generally introduced in the form of their nitrate solutions. These nitrates are easily soluble. The nitrate solutions are precipitated with alkali compounds, as, for example, with caustic soda or potash, and yield readily filterable precipitates, which, after reduction, yield very active catalysts. The use of these nitrate solutions has proven very advantageous, since the residual alkali remaining in the precipitated catalyst mass after the precipitation, contains no disturbing admixtures and may be very easily removed by careful washing with water.

The use of nitrate solutions for the formation of precipitated catalysts is, however, very disadvantageous with respect to the high production cost. It is always necessary to dissolve the iron and any activators in an excess of nitric acid which, due to the cost of the nitric acid itself, renders the catalyst particularly expensive. In addition, considerable losses of nitric acid occur in the dissolving process itself. Suggestions have been made to evaporate the mother liquid running off after the precipitation and to recover the valuable alkali nitrate. This procedure, however, is also expensive.

One object of this invention is the production of a precipitated iron catalyst without the expense involved in the production of such a catalyst from nitrate solutions. This, and still further objects will become apparent from the following description:

It has now been found that precipitated iron catalysts for the catalytic hydrogenation of carbon monoxide may be produced from ferrous sulfate solutions if the precipitation of the catalysts from these solutions is so effected that about 10 to 50%, and preferably 25 to 35% of the iron present is converted into the trivalent form, and if the washing of the precipitate is effected with ion exchangers with an oxidation of the residual iron being effected during the drying, so that approximately 70 to 90% of the total iron in the final catalyst is present as trivalent iron.

The disadvantages in the use of the nitrate solutions are completely eliminated since iron sulfate is obtained as a cheap waste product from various chemical processes, as, for example, in pickling processes and in the production of titanium white, etc. The impurities contained in the sulfate obtained in this manner are negligible and have no adverse effect on the catalysts formed.

Care, however, must be taken in the production of the catalysts with the use of iron sulfate so that practically no sulfur in the form of sulfate is contained in the finished catalyst. This is due to the fact that sulfide would form during the reduction and the hydrogen sulfide formed therefrom would immediately poison the catalyst.

In accordance with the invention, the iron sulfate should be dissolved in hot water so that the concentration of the bivalent iron will be between 5 and 100 grams, and preferably between 20 and 60 grams of Fe per liter. The solution is then heated with the addition of the necessary or desired activators such as, for example, copper, silver or calcium. Precipitation is then effected with an alkali solution, as, for example, a caustic soda solution. The alkali solution is heated prior to the precipitation. It is necessary, in accordance with the invention, that about 10–50% of the bivalent iron, and preferably 25 to 35% be converted into the trivalent form. This may be effected by blowing an oxygen-containing gas, as, for example, a powerful stream of air, through the hot caustic soda solution immediately before starting the precipitation and while the precipitation is being effected. The air, if desired, may be preheated by a preheater to a temperature between 80 and 100° C. It is also possible to use other oxidizing gases, as, for example, NO or $NO_2$, which may be added to the air in optional quantities, for the purpose of oxidizing the catalyst. The flow rate of the air should be so high that approximately 10 to 50, and preferably 20 to 30 cubic meters of air per kilogram of iron are hourly blown through the solution. The precipitation is effected in the known manner by adding the heated sulfate solution to the hot alkali solution. The concentration of the alkali solution should be expediently chosen so that the quantity of alkali present in the precipitating solution is 10–130 gms., and preferably 60–100 grams of alkali, such as, for example, of soda. The precipitation is completed after approximately 2 to 6 minutes. During all this time the air stream is blown through at the flow rate mentioned above. As experience has shown, approximately 25 to 30% of the iron is obtained in the form of trivalent iron in the precipitated catalyst mass by this method of operation. During the precipitation the temperatures should be maintained at approximately 50 to 100° C. and preferably between 60 and 95° C., it not being absolutely necessary for the alkali and iron solutions to have the same temperatures.

If a good and highly active catalyst is to be obtained in accordance with the invention, it is necessary to remove the alkali adsorbed on the iron hydroxide as completely as possible. The alkali will be present in the form of sulfate. Washing with hot condensate water, such as is used for washing iron nitrate solutions, will not be sufficient for this purpose. It is absolutely necessary to add ion exchangers to the condensate used for the washing in order to obtain a considerably easier removal of the sulfate ions by ion exchange. These ion exchangers are preferably easily soluble ammonia compounds. Examples of compounds of this type which have proven particularly effective include ammonium nitrate, ammonium carbonate and ammonium acetate. It is, however, also possible to use various other easily soluble ammonia compounds for this purpose. $NH_3$ is also suitable depending on the type of catalyst.

It has proven advantageous to keep the initial concentration of the ion exchangers in the condensate relatively low, since, in the first phase of the washing much of the alkali sulfate adsorbed on the iron hydroxide can be removed by washing with condensate alone. In the last phase of the washing the quantity of the ion exchanger, as, for example, ammonium carbonate or nitrate, must be increased. The concentration of the ion exchangers in the washing water may range between 0.2 and 20%. The washing is preferably effected with washing waters containing approximately 0.2 to 2% of ion exchangers.

As mentioned above, it is desirable to keep the sulfur content of the finished catalyst as low as possible to prevent the formation of the hydrogen sulfide which is a catalyst poison. It has been found that sulfur contents in the catalyst of not more than 0.1% and preferably below 0.05% have no adverse effect.

The remaining steps in the preparation of the catalyst from iron sulfate in accordance with the invention are practically the same as those conventionally known when using iron nitrate solutions. The carefully washed catalyst mass is impregnated in accordance with its intended purpose, molded, if necessary or desired, and dried at a temperature of approximately 100 to 110° C. to a water content of the finished catalyst of approximately 3 to 5%.

It is essential, however, in accordance with the invention, that all these expedients be effected with the abundant admittance of an oxidizing medium and preferably air, so that more than 70% and preferably more than 80% of the total iron will be present in a trivalent form in the finished catalyst. Thus, for example, a sufficient amount of air is used at elevated temperature when blowing a washed catalyst mass dry in the filter press and enough air is used for the final drying in the drier, so that at least 70% of the iron in the finished catalyst is in the trivalent form. With precipitating on a small scale, such as, for example, on a suction filter, a good oxidation is obtained by suspending and washing the precipitated catalyst mass in thin layers.

In principle, it is also possible to work during the precipitation without the aforementioned oxidizing method of operation and to effect the total oxidation of the bivalent iron into the trivalent iron in the subsequent operation step, i. e. in the drying of the precipitated, washed and impregnated catalyst mass. Comparative experiments have shown, however, that the method of operation according to the invention with a partial oxidation during the precipitation and with a subsequent after-oxidation during the drying results in catalysts with considerably better properties, for example, with a lower temperature range, a lower methane formation, etc.

The finished catalyst grains are freed from dust and splintered grains by sieving, and then may be reduced by using hydrogen, carbon monoxide, nitrogen or mixtures thereof. The reduction temperatures used should be in the range of about 150 to 350° C., and preferably between 220 and 320° C. A high flow rate of the reduction gas of more than 50 centimeters and preferably of more than 1 meter per second, is generally favorable. The layer depth during the reduction may be below 30 cm., preferably between 30 and 100 cm. and also may be considerably higher. If desired, the reduction may be effected in the synthesis furnace itself in the known manner. The catalyst, in accordance with the invention, may also contain certain amounts of carrier substances as, for example, kieselguhr, $Al_2O_3$, Tonsil, activated bleaching earths, etc. If the catalysts formed in accordance with the invention are to be used in the production of synthesis products containing oxygenated compounds, especially alcohols, they should contain at least 50% and preferably more than 60% of their iron content in the form of metallic iron.

If, on the other hand, synthesis products with a higher content of hydrocarbons are desired, these may be obtained by using the catalyst in accordance with the invention by maintaining the free iron in the reduced catalyst below 50% and preferably below 30%.

In several respects, the behavior of the new catalysts is different from that of the catalysts obtained from trivalent iron solutions. The catalysts in accordance with the invention possess on the whole a considerably higher apparent density (approximately 1 and higher), while that of the catalysts prepared from trivalent iron is between 0.5 and 0.8. The activity of the catalysts in accordance with the invention is in most cases higher whereby, based on the same synthesis conditions, either increased conversion rates with a lower methane formation are obtained or the catalysts may be operated at a somewhat higher gas load as compared with that of the catalysts prepared from trivalent iron. Furthermore, an increased life time above that of catalysts prepared from trivalent iron is reached by the aforementioned lower synthesis temperature.

The catalysts formed in accordance with the invention may be used for synthesis which are carried out in both single and multi-stage operation with both straight gas passage and gas recycling. In multi-stage operation, a partial removal of the formed carbon dioxide between the individual stages is advantageous. The synthesis pressures may range from atmospheric pressures to pressures above 100 atmospheres, and are preferably between 20 and 40 atmospheres. The synthesis temperatures should be between approximately 150 and 300° C. The gas load may be varied within wide limits of approximately 10 parts by volume of gas per part by volume of catalyst per hour up to more than 500 parts by volume of gas per part by volume of catalyst per hour. The composition of the gas may vary between 0.5 and 2 parts of hydrogen for each part of carbon monoxide. The catalyst layer depths may be 5 meters, and may also be in excess of 5 meters up to approximately 12 meters.

If the catalyst is to be used for synthesis with a high yield of oxygen-containing compounds, it is desirable that the precipitated mass, after the washing, be impregnated to about 2 to 15% and preferably 4 to 12% of alkali, calculated on the iron, in the form of hydroxide, oxide, carbonate, etc., or salts of volatile or decomposable acids, and reduced to a metallic iron content of at least 50% and preferably more than 60%.

If the catalyst is to be used for the production of synthesis products with the greatest possible portion of hydrocarbons, the precipitated mass, after washing, should be impregnated with alkali salts of non-volatile acids, ferric acids, silicic acid, tungstic acid, etc., impregnation being effected so that the acid component is above 1% by weight and preferably above 10% by weight, calculated on the iron, and the quantity of alkali is between 1 to 10% and preferably 1 to 7% calculated on iron. The catalyst should be reduced to a metallic iron content of less than 50% and preferably less than 30%.

The invention will be further illustrated in the following examples, which are given for illustration and not limitation.

*Example 1*

A boiling solution consisting of ferrous iron sulfate and copper sulfate, containing 5 parts of copper for every 100 parts of iron and having a concentration of 40 parts of iron in 1000 parts of water, was precipitated by pouring it into a caustic soda solution of 80° C. containing 90 gms. of $Na_2CO_3$ per liter. During the precipitation, an air stream was blown through the precipitation apparatus using an air flow rate of 6000 liters for every 25 gms. of iron, the blowing time being 3.5 minutes. Immediately thereafter, the precipitated catalyst mass was freed from the mother liquor by subjecting it to a suction filtration and was then washed twice with a quantity of boiling condensate corresponding to twelve times the quantity of present iron. Finally, the catalyst mass was washed three times by suspending it in an ammonium carbonate solution containing 5 to 10 gms. of ammonium carbonate dissolved in 1500 cc. 1500 cc. of washing solution for every 25 gms. of iron were used in each of the three washings.

After the last washing, the sulfur content in the finished catalyst was only 0.02%. 28% of the total Fe were now present as Fe (III), the balance being a Fe (II). Then the catalyst mass was impregnated in a potassium carbonate solution in such a manner that 8 parts of alkali calculated as $K_2O$ for every 100 parts of iron were contained in the mass.

The catalyst mass was dried for 24 hours at a temperature of 110° C. with circulating air and crushed to a grain size of 2 to 4 mm. The content of Fe (III) was now 88%. Thereafter, the catalyst was reduced for 1 hour at a temperature of 300° C., using a gas mixture consisting of 75% of hydrogen and 25% of nitrogen at a linear gas velocity of 1.4 meters per second, measured in the cold state. The reduction value of the catalyst was 68% of free iron.

This catalyst was charged to the synthesis at a synthesis pressure of 30 atmospheres and a gas load of 100 volumes of water gas per volume of catalyst per hour. A conversion rate of 60% $CO+H_2$ was obtained at a temperature of 205° C. The methane formation was between approximately 4.5 and 6%. The yield of oxygen-containing compounds was 50%, based on total liquid product.

*Example 2*

A solution consisting of ferrous iron sulfate and copper sulfate containing 2 parts of copper for every 100 parts of iron and having a concentration of 45 parts of iron for every 1000 parts of water was heated to 90° C. and precipitated by pouring it into a caustic soda solution of 75° C. having a concentration of 68 gms. of $Na_2CO_3$ per liter. The pH value during the precipitation was 7.2. During the precipitation, an air stream was blown through the precipitation apparatus using an air flow rate of 650 liters per 25 gms. of iron and a blowing time of 4.5 minutes. Thereafter, calcium carbonate at a quantity of 10%, calculated as CaO and based on the present iron, was added, while vigorously stirring the mass. Immediately thereafter the precipitated mass was separated from the mother liquor by subjecting it to a suction filtration and washed at first with a quantity of boiling condensate water corresponding to 12 times the present iron. Finally, the catalyst mass was washed twice by suspending it in a solution of ammonium carbonate dissolved in 1500 cc. of solution. The sulfur content after the last washing was 0.05%. 28.5% of total iron were now present in the form of Fe (III), the balance being Fe (II).

The catalyst was then impregnated with a solution of potassium water glass in such a manner that 3 parts of $K_2O$ and 7.6 parts of $SiO_2$ for every 100 parts of iron were contained therein.

The catalyst mass was dried for 24 hours with circulating air at a temperature of 105° C. and crushed to a grain size of 1.5 to 3 mm. The content of Fe (III) was now 91%. Thereafter, the catalyst was reduced for 90 minutes at a temperature of 305° C., using a gas mixture consisting of 75% of $H_2$ and 25% of $N_2$ at a linear gas velocity of 1.4 meters per second (measured in the cold state). The reduction value was 35%.

The catalyst was charged to the synthesis at a synthesis pressure of 10 atmospheres, using a gas load of 100 volumes of water gas ($CO:H_2=1:1.2$) per volume of catalyst per hour. A conversion rate of 66% of $CO+H_2$ was obtained at a temperature of 215° C. The resulting liquid product contained 40% of hydrocarbons boiling above 320° C. Oxygen-containing compounds were contained only to a low extent.

I claim:

1. Process for the production of iron catalysts for the catalytic hydrogenation of carbon monoxide which comprises precipitating iron from a ferrous sulfate solution containing about 5 to 100 grams of bivalent iron per liter with an alkali solution while oxidizing about 10 to 50% of the iron present to the trivalent form, washing the precipitate obtained with water containing about 0.2 to 20% of an easily soluble ammonia compound selected from the group consisting of ammonia, ammonium nitrate, ammonium carbonate and ammonium acetate, drying the washed precipitated mass, oxidizing the precipitated mass during said drying to a trivalent iron content of at least 70% of the total iron present, and recovering a precipitated iron catalyst for use in catalytic carbon monoxide hydrogenation after reduction.

2. Process according to claim 1, in which said oxidizing to a trivalent iron content of at least 70% is effected during the said washing and drying with the abundant admittance of an oxygen-containing gas.

3. Process according to claim 2, in which said oxidation is effected to a trivalent iron content of at least 80%.

4. Process according to claim 3, in which said oxidizing during precipitation is effected to convert about 25 to 35% of the iron present to the trivalent form.

5. Process according to claim 1, in which said oxidizing during said precipitation is effected by blowing air through the precipitating solution at a flow rate of about 10 to 50 cubic meters of air per kilogram of iron.

6. Process according to claim 1, in which said ferrous sulfate solution contains about 20 to 60 grams of bivalent iron per liter.

7. Process according to claim 1, in which the concentration of said easily soluble ammonia compound in the washing water is increased during said washing and in which said washing water has a concentration of said easily soluble ammonia compound between about 0.2 and 2.0%.

8. Process according to claim 1, which includes impregnating said precipitate after said washing with a member selected from the group consisting of alkali hydroxides, alkali oxides, and alkali carbonates, to an alkali content of about 2 to 15% calculated on the iron present.

9. Process according to claim 8, in which said recovered catalyst is reduced to a metallic iron content of at least 50% for use in carbon monoxide hydrogenation with the production of high yields of oxygen-containing compounds.

10. Process according to claim 1, which includes impregnating said precipitate after said washing with an alkali salt of a non-volatile acid in amount of the acid component of at least 1% by weight of the iron, and an alkali component of about 1 to 10% by weight of the iron present.

11. Process according to claim 10, in which said impregnation is effected with an acid component of at least 10% by weight of the iron and an alkali component of about 1 to 7% by weight of the iron present.

12. Process according to claim 11, in which the recovered catalyst is reduced to a metallic iron content not in excess of 50% for use in a catalytic hydrogenation of carbon monoxide with the production of synthesis products consisting predominantly of hydrocarbons.

References Cited in the file of this patent

UNITED STATES PATENTS

| | | |
|---|---|---|
| 2,063,302 | Eversole | Dec. 8, 1936 |
| 2,133,267 | Ayers | Oct. 18, 1938 |
| 2,283,173 | Bates | May 19, 1942 |
| 2,374,454 | Oliver et al. | Apr. 24, 1945 |
| 2,449,071 | Hawk et al. | Sept. 14, 1948 |
| 2,507,510 | Frankenburg | May 16, 1950 |
| 2,534,018 | Gresham et al. | Dec. 12, 1950 |
| 2,539,847 | McGrath | Jan. 30, 1951 |
| 2,544,756 | Guest et al. | Mar. 13, 1951 |
| 2,560,970 | Martin | July 17, 1951 |
| 2,603,610 | Amos et al. | July 15, 1952 |

OTHER REFERENCES

Storch et al.: "Synthetic Liquid Fuels from Hydrogenation of Carbon Monoxide," pages 83 and 84. Bureau of Mines, Technical Paper 709 (1948).